United States Patent
Van Herpen

(10) Patent No.: US 8,215,788 B2
(45) Date of Patent: *Jul. 10, 2012

(54) TUFTED TEXTILE

(75) Inventor: Maarten Marinus Johannes Wilhelmus Van Herpen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 69 days.

This patent is subject to a terminal disclaimer.

(21) Appl. No.: 12/743,857

(22) PCT Filed: Nov. 14, 2008

(86) PCT No.: PCT/IB2008/054776
§ 371 (c)(1),
(2), (4) Date: May 20, 2010

(87) PCT Pub. No.: WO2009/066215
PCT Pub. Date: May 28, 2009

(65) Prior Publication Data
US 2010/0271805 A1    Oct. 28, 2010

(30) Foreign Application Priority Data

Nov. 23, 2007   (EP) .................................. 07121400
Mar. 4, 2008    (EP) .................................. 08152239

(51) Int. Cl.
*F21S 8/00* (2006.01)

(52) U.S. Cl. ........................................ 362/153; 362/543

(58) Field of Classification Search .................. 362/84, 362/104, 153, 249.01, 249.02, 249.04, 253, 362/255, 276, 330, 471, 488, 543, 545, 559, 362/800, 802, 806; 340/815.45, 815.73
See application file for complete search history.

(56) References Cited

U.S. PATENT DOCUMENTS

| | | | |
|---|---|---|---|
| 4,234,907 A | 11/1980 | Daniel | |
| 4,737,764 A | 4/1988 | Harrison | |
| 4,761,047 A | 8/1988 | Mori | |
| 4,794,373 A * | 12/1988 | Harrison | 340/286.01 |
| 5,375,044 A * | 12/1994 | Guritz | 362/104 |
| 6,203,636 B1 | 3/2001 | Popper et al. | |

(Continued)

FOREIGN PATENT DOCUMENTS

DE    4228570 A1    3/1994

(Continued)

OTHER PUBLICATIONS

CRC Handbook of Chemistry and Physics, 69th Edidtion (1988-1989), Robert C. Weast, Editor in Chief, CRC Press, Inc. pp. E-208, E-406.

*Primary Examiner* — Hargobind S Sawhney

(57) ABSTRACT

The present invention relates to a tufted textile (100) comprising a primary backing layer (10) which is substantially permeable to light, yarns (40) forming tufts on a first side of the primary backing layer, an adhesive layer (30) provided on a second side of the primary backing layer opposite from the first side, and a light source (50; 80) and a conductor arrangement (60) for the light source arranged in a position facing the second side of the primary backing layer. The adhesive layer, the light source and the conductor arrangement, are arranged so as to allow light from the light source to reach the primary backing layer. The tufted textile (100) may be a carpet.

14 Claims, 7 Drawing Sheets

U.S. PATENT DOCUMENTS

| | | |
|---|---|---|
| 6,481,877 B1 | 11/2002 | Bello, Jr. |
| 6,718,576 B1 * | 4/2004 | Shih .................................. 5/417 |
| 2006/0082987 A1 | 4/2006 | Dorsey et al. |
| 2007/0037462 A1 | 2/2007 | Allen et al. |
| 2007/0177370 A1 * | 8/2007 | Nakamura et al. .............. 362/84 |

FOREIGN PATENT DOCUMENTS

| | | |
|---|---|---|
| DE | 29825103 U1 | 10/2004 |
| DE | 202006015357 U1 | 1/2007 |
| DE | 102005036533 A1 | 2/2007 |
| DE | 102006012606 A1 | 11/2007 |
| EP | 0155157 A2 | 9/1985 |
| EP | 0261811 A2 | 3/1988 |
| EP | 0323682 A1 | 7/1989 |
| EP | 1193340 A2 | 4/2002 |
| EP | 1306477 A1 | 5/2003 |
| FR | 2592963 A1 | 7/1987 |
| GB | 1336030 A | 11/1973 |
| JP | 1079702 A | 3/1989 |
| JP | 08288053 A | 11/1996 |
| JP | 2003210308 A | 7/2003 |
| KR | 2002086396 A | 11/2002 |
| WO | 2006057531 A1 | 6/2006 |
| WO | 2006098799 A2 | 9/2006 |
| WO | 2006129272 A2 | 12/2006 |
| WO | 2007033980 A2 | 3/2007 |
| WO | 2009066216 A1 | 5/2009 |
| WO | 2009066224 A1 | 5/2009 |
| WO | 2009066226 A1 | 5/2009 |
| WO | 2009066228 A1 | 5/2009 |

* cited by examiner

TUFTED TEXTILE

FIELD OF THE INVENTION

The present invention relates to a tufted textile, in particular to a tufted textile comprising a primary backing layer, yarns forming tufts on a first side of the primary backing layer, an adhesive layer provided on a second side of the primary backing layer opposite from the first side and a light source.

BACKGROUND OF THE INVENTION

Tufted textiles are typically made by providing a primary backing with yarns which form tufts on its side facing the user during use. Examples of tufted textiles include carpets, draperies and upholstery fabrics. Throughout the description, carpet is taken as an example of the tufted textiles for explaining the present invention. It will be understood that most of the advantages of the present invention explained in relation to carpets are also applicable for other types of tufted textiles such as draperies and upholstery fabrics.

Carpets generally comprise a primary backing layer provided with yarns forming tufts, a second backing layer, an adhesive layer provided between the primary backing layer and the second backing layer. The yarns penetrate the primary backing layer to form tufts projecting from the pile surface on which people can walk. Stitches are present on the opposite side. The adhesive layer present on the stitch side adheres the stitches to the primary backing layer and holds the tufts in place, as well as adhering the primary backing layer and the second backing layer.

As used in this description, the term 'second backing layer' includes the backing layer which forms the surface of the carpet opposite from the pile surface. Such a layer is usually referred as a 'secondary backing layer' and is commercially available. These 'secondary backing layers' have an advantage that they are well-suited for carpet backing and fit in well with the carpet manufacturing method used in carpet factories. However, it is to be noted that a second backing layer is not restricted to a secondary backing layer, and further layers may be present on the side of the second backing layer facing away from the adhesive layer.

For many applications, it is required for the carpets to pass a number of tests. The carpets may be tested for, among other things, appearance retention, colorfastness to light, cleaning and crocking, tuft bind, delamination strength and electrostatic propensity. An appearance retention test may be performed using the Hexapod Drum, Vettermann Drum or Tetrapod Drum. In these tests, a ball with multiple projections modeling feet tumbles over the pile surface of a carpet, and the appearance is subsequently evaluated. Examples of the appearance retention test method are described in ISO TR 10361 and ISO/CD 12950 and ASTM D-5252 of Hexampod Drum Tester guidelines. The delamination strength of the second backing layer from the primary backing may be performed according to a test described in ASTM D-3936. A test for the strength of the adhesion of the stitches to the backing layer structure may be ASTM D1355. The second backing layer of the carpet also may need to be tested for air permeability. During curing of the binders, vaporized binders must be able to escape from the backings. The air permeability of the second backing layer may be tested according to ASTM D-737.

WO2006/057531 discloses a light emitting mat for vehicles. The light-emitting mat comprises a carpet part covered with lots of cilia for the purposes of soundproofing, warmth and impact-absorption and having an opening at a portion thereof; a transparent decoration plate having decorative patterns which correspond to a shape of the opening of the carpet part and supporting the carpet part; a support plate having a recess with a shape which corresponds to the shapes of the opening and the decorative patterns for supporting the transparent decoration plate; a transparent light-emitting plate having a size that allows it to be mounted in the recess of the support plate; a plurality of LEDs installed in a plurality of insertion grooves, respectively, formed along edges of the transparent light-emitting plate; a power supply unit for supplying electric power to the light-emitting diodes; and a binder for binding the carpet part, the transparent decoration plate and the support plate.

In such an arrangement, the cilia are not present in the part of the opening in the carpet part, above the light emitting plate. This opening part without cilia does not have soundproofing, warmth and impact-absorption properties. This results in that the light-emitting part has a restriction in its size.

SUMMARY OF THE INVENTION

It is an object of the invention to provide an improved tufted textile.

This object is achieved by the present invention which provides a tufted textile comprising:
  a primary backing layer which is substantially permeable to light,
  yarns forming tufts on a first side of the primary backing layer,
  an adhesive layer provided on a second side of the primary backing layer opposite from the first side, and
  a light source and a conductor arrangement for the light source arranged in a position facing the second side of the primary backing layer,
  wherein the adhesive layer, the light source and the conductor arrangement, are arranged so as to allow light from the light source to reach the primary backing layer.

An element which is substantially permeable to light refers e.g. to an element through which at least a portion of light hitting the element is allowed to transmit. The element may partly or completely be made of a translucent material, or the element may have apertures through which light can penetrate.

The invention is based on the realization that the yarns forming tufts of the textile form a structure having enough openings to transmit light, even though the textile appears to be opaque to human eyes. For appearance reason, the tufts are provided in such a way that the primary backing layer is not visible, but the light can still penetrate through the tuft structure. Placing a light source under a primary backing layer which is permeable to light results in that the light from the light source is emitted from the tufted surface.

Such a tufted textile has the advantage that it has less size restriction of the light emitting part.

The adhesive layer holding the tufts in place may also be used to hold the light source and the conductor arrangement in place under the primary backing layer. The light source may be positioned between the second side of the primary backing layer and the adhesive layer. Opening(s) may be provided on the surface of the adhesive layer facing the primary backing layer, in which the light source can be placed.

According to a preferred embodiment of the invention, the adhesive layer is at least partially permeable to light for allowing transmission of the light from the light source to the primary backing layer. This allows that the light source and the conductor arrangement are arranged on the side of the adhesive layer facing away from the primary backing layer, i.e., on the surface of the adhesive layer. In this case, the light source and the conductor arrangement may be fixed in place with an additional adhesive means. The light source may also be fully encaplusated in the adhesive layer. Alternatively, the light source may be positioned under the adhesive layer with a space between the light source and the adhesive layer.

According to a further embodiment of the invention, the tufted textile further comprises a second backing layer provided on a side of the adhesive layer facing away from the primary backing layer, wherein the primary backing layer, the adhesive layer and the second backing layer have substantially the same surface area,
the adhesive layer is substantially permeable to light and
the light source, the conductor arrangement and the second backing layer are arranged so as to allow light from the light source to reach the adhesive layer.

Without the second backing layer, the textile is more flexible. This may be preferable for draperies and upholstery fabrics. On the other hand, the addition of the second backing layer to the tufted textile as in this embodiment enhances the strength of the textile. This may be preferable for carpets. Compared to draperies and upholstery fabrics, carpets have the specific advantage of having more robustness and thickness, due to which the light source is better protected. Additionally, the manufacturing method for carpets allows easy incorporation of the light source inside the carpet structure.

The light source may be one or more LEDs. With a structure defined above, there is no restriction in how to distribute the LEDs in, below, or on the second backing layer. Unlike the prior art mat, the LEDs can be placed over substantially the whole area of the second backing layer. The lack of the opening above the LEDs as in the prior art mat makes the carpet according to the present invention more suitable for use in places where light emission is not always needed. There is also no step required for cutting the primary backing layer in the portion above the LEDs, so the manufacturing of the carpet is simple. Furthermore, the primary backing layer contributes to the protection of the LEDs from possible damages caused by e.g. feet or chair legs.

According to a further embodiment of the invention, the LEDs and the conductor arrangement are integrated in the second backing layer, wherein the second backing layer is at least partially permeable to light for allowing transmission of the light from the LEDs to the adhesive layer, or the LEDs and the conductor arrangement are provided on the surface of the second backing layer facing the adhesive layer. These two arrangements of the LEDs, the conductor arrangement and the second backing layer ensure that the light from the LEDs reach the adhesive layer, to be further transmitted to the pile surface of the carpet. The advantage of this approach is that the LEDs are protected within the laminated structure of the carpet. The LEDs are protected against, e.g. against abrasion or impact, which could damage e.g. the electronics or damage a water-tight seal around the electronics. On the pile surface side, the LEDs are protected by the primary backing with tufts, and on the opposite side the LEDs are protected by the second backing Protection of the backside is especially important during installation of the carpet.

According to a further embodiment of the invention, the primary backing layer is substantially translucent. As used in this description, the term 'translucent' means that all or part of the wavelengths of the visible light is permitted to pass through the material, with or without being diffused. This has the advantage that the decrease of the intensity of the light emitted from the LEDs by the primary backing layer is reduced. For example, more than 5%, or more than 10%, or more than 30% of light intensity may be transmitted.

According to a further embodiment of the invention, the primary backing layer has apertures which are covered by the tufts. In such an arrangement where the apertures are not visible to human eyes, the carpet can be used as a regular carpet when the LEDs are off. The apertures increase the intensity of the emitted light. The freedom of the choice of material for the primary backing layer is high, because there is no restriction that the primary backing layer material has to be translucent.

According to a further embodiment of the invention, at least one of the primary backing layer and the second backing layer comprises polypropylene, nylon or jute. These materials have the advantage that they are of relatively low cost. It is easy to manufacture a translucent structure with polypropylene or nylon. Also, the fact that these materials are commonly used in existing tufted carpets makes the carpet according to the invention easy to manufacture. It is noted that these backing layers may substantially consist of the above materials.

According to a further embodiment of the invention, the adhesive layer comprises latex. The latex may be a translucent latex. It is noted that the adhesive layer may substantially consist of latex. The latex may be based on terpolymers of styrene, butadiene and an acidic vinyl monomer. When the adhesive layer substantially consists of translucent latex and comprise substantially no light scattering particles, the light from the LEDs can leave the carpet efficiently. Thus, preferably no light scattering fillers are used in the adhesive and the adhesive layer is translucent.

According to a further embodiment of the invention, the adhesive layer comprises acrylics. The acrylics may be a translucent acrylics. It is noted that the adhesive layer may substantially consist of acrylics. An example of acrylics is polyacrylate ester. Advantages of acrylics are hardness, flexibility and resistance against UV. Acrylics are also highly resistant to heat, which makes it an especially suitable material for use in combination with LEDs which generate a relatively large amount of heat. Latex and acrylics may also be used in combination.

According to a further embodiment of the invention, at least one of the primary backing layer, the second backing layer and the adhesive layer comprises light scattering particles, which are also referred as fillers. Fillers have the advantage of reducing the cost of the carpet, while bulking up the adhesive at the same time. Because the fillers scatter light, this results in that the light from the carpet appears to originate from an area larger than the original emission spot. It is advantageous when a homogeneous light emission is desired. The light scattering particles may be calcium carbonate. The advantage of calcium carbonate is that it is of relatively low cost. Calcium carbonate may be in the form of calcite or chalk. The light scattering particles may also be kaolinite such as china clay fillers. Typically the fillers are used in quantities such as for example 600 g/l, but for many embodiments of the current invention it is preferred that much lower amounts are used in order to increase the light transmittance.

According to a further embodiment of the invention, the adhesive layer comprises electrically conductive particles. The electrically conductive particles give the carpet antistatic properties. The electrically conductive particles may be e.g. carbon black, potassium formate (HCOOK), tin-oxide, indium-tin-oxide or silver.

According to a further embodiment of the invention, the adhesive layer comprises anti-oxidants. The anti-oxidants make the adhesive layer more resistant to heat.

This is advantageous because LEDs can generate a substantial amount of heat. Also, latex without anti-oxidants may age faster and become yellow after some time.

According to a further embodiment of the invention, the second backing layer has an air permeability of at least 76.2 m$^3$/min/m$^2$. Air permeability of the second backing layer can be determined according to ASTM D-737, with a pressure differential equal to 0.5 inch (1.27 cm) water. An acceptable value is 250 ft$^3$/min/ft$^2$ (76.2 m$^3$/min/m$^2$), but more preferred values are in the range of 350-800 ft$^3$/min/ft$^2$ (106.7-243.8 m$^3$/min/m$^2$). Second backing layers with an air permeability of only 80 ft$^3$/min/ft$^2$ (24.4 m$^3$/min/m$^2$) are considered to be inadequate for high binder cure rates.

According to a further embodiment of the invention, the second backing layer has apertures for air passage. Vaporized binders used for the adhesive layer can pass through the apertures during curing of the carpet. With this embodiment, it is ensured that the air permeability of the second backing layer is sufficiently high.

According to a further embodiment of the invention, the carpet has a delamination strength of at least 44.6 kg/m between the primary backing layer and the second backing layer.

According to a further embodiment of the invention, the conductor arrangement and connections between the LED and the conductor arrangement are embedded in a water-tight enclosure. This ensures that the electrical safety of the carpet is ensured, even when the carpet is wet.

According to a further embodiment of the invention, the LEDs are connected to form a circuit comprising sets of LEDs connected in series, the sets being connected in parallel. This arrangement has an advantage that the construction is simple and easy to manufacture. The conductor arrangement may be pre-manufactured on a sheet of e.g. plastic, after which it is provided on or integrated in the second backing layer.

According to a further embodiment of the invention, the conductor arrangement comprises two grids of conductive wires, which are electrically isolated from each other.

According to a further embodiment of the invention, each of the LEDs is covered with a protective cover. The protective cover may be made of silicone rubber. This not only ensures the electrical safety of the carpet, but also that the carpet performs better in the appearance retention test mentioned above. During the test, the LEDs are better protected against the impact of the balls tumbling over the carpet.

According to a further embodiment of the invention, the LEDs and the circuit arrangement are arranged so that at least a part (and preferably a substantial part, or more preferably all) of the LEDs is operable when the carpet is reduced in size. This may be achievable by a carpet in which the second backing layer comprises, successively from the side facing away from the adhesive layer, a first electrically insulating layer, a first electrically conductive layer, a second electrically insulating layer, a second electrically conductive layer and a third electrically insulating layer, wherein each of the LEDs has a first and a second connector respectively connected to the first and the second electrically conductive layer. The first and the second electrically conductive layers act as the conductor arrangement. When the carpet is cut in an area between discrete LEDs, the remaining LEDs are still connected to the power source, resulting in that the LEDs are still able to be turned on and off. This substantially reduces the limitation in the size or shape the carpet is cut.

Also, a carpet in which the LEDs are connectable to the power source in parallel may achieve the above-mentioned enhanced freedom in cutting. When part of the carpet comprising some of the LEDs is cut away in an embodiment where the LEDs are connected in parallel to the power source, the LEDs in the remaining portion are still connected to the power source, and remain operable.

According to a further embodiment of the invention, at least the second electrically conductive layer and the third electrically insulating layer are substantially translucent.

According to a further embodiment of the invention, the first and the second conductive layers substantially consist of a material embedded with electrically conductive particles. The electrically conductive particles give the layers electrical conductivity, so the material itself may be electrically insulating. The electrically conductive particles may be e.g. tin-oxide, indium-tin-oxide, or silver.

According to a further embodiment of the invention, the material of the first and the second conductive layers substantially consists of a translucent rubber.

According to a further embodiment of the invention, the electrically conductive particles are light scattering. Because the electrically conductive particles also have light scattering properties in this embodiment, there is no need for additional light scattering particles in the carpet for a homogeneous light output.

According to a further embodiment of the invention, the carpet further comprises a third backing layer adhered to a side of the second backing layer facing away from the adhesive layer.

According to a further embodiment of the invention, the LEDs are Red-Green-Blue (RGB) LEDs. For example, a portion of the LEDs is red LED, another portion is green LEDs and yet another portion is blue LEDs. The use of RGB LEDs is advantageous because it allows the color of the carpet to be changed. For example when white tufts are used in combination with RGB LEDs, it is possible to change the color of the carpet into any desired color. For example, by setting the RGB LEDs to the color green, the tufts of the carpet will look green.

According to a further embodiment of the invention, the light source comprises a light emitting sheet arranged on a side of the second backing layer facing away from the adhesive layer. The light emitting sheet may be adhered to the second backing layer by a second adhesive layer. The light emitting sheet may also be adhered to the second backing layer by mean of an adhesive tape. In this case, the second adhesive layer between the light emitting sheet and the second backing layer is not required. It is also noted that the light emitting sheet may be positioned under the second backing layer with a spacing in between. This can be realized, e.g. by adhering only a part, e.g. the rim of the light emitting sheet, to the second backing layer.

According to a further embodiment of the invention, the light emitting sheet comprises an electroluminescent panel, an LED panel or an OLED panel. The advantage of an electroluminescent panel, an LED panel or an OLED panel is that they may be made flexible and thin, which makes them more suitable for use in the present invention. The light emitting sheet may also comprise other light sources such as incandescent and fluorescent lighting.

According to a further embodiment of the invention, the tufted textile further comprises a reflecting layer positioned to a side of the light emitting sheet facing away from the second backing layer. The reflecting layer can direct the light from the light emitting sheet to the pile surface and increase the intensity of the light emitted from the tufted textile.

The invention also provides a second backing layer structured as defined in any one of the embodiments above.

The invention also provides an illumination system comprising a carpet as defined in any one of the embodiments above, control circuits of the LEDs and a lighting controller for controlling signals provided to the control circuits.

The invention also provides a method of manufacturing a carpet comprising a light source and a conductor arrangement for the light source, comprising the step of:

adhering a primary backing layer which is substantially permeable to light provided with yarns forming tufts and a second backing layer having substantially the same surface area as the primary layer with an adhesive layer which is substantially permeable to light and having substantially the same surface area as the primary backing layer and the second backing layer, wherein the light source, the conductor arrangement and the second backing layer are arranged so as to allow light from the light source to reach the adhesive layer. The light source may be one or more LEDs. Alternatively, the light source may comprise a light emitting sheet arranged on a side of the second backing layer facing away from the adhesive layer.

According to a preferred embodiment of the invention, the step of adhering comprises the sub-steps of:

applying a first adhesive sub-layer on the side of the primary backing layer facing away from the tufts;

drying the first adhesive sub-layer;

applying a second adhesive sub-layer on the dried first adhesive sub-layer and applying the second backing layer to the second adhesive sub-layer.

During manufacturing of the carpet, the adhesive layer may be applied in two steps. First a pre-coat of an adhesive material is applied to the stitch side of the primary backing layer, in order to lock the tufts in place. After the pre-coat layer has dried, a second adhesive layer is applied on the dried pre-coat layer, which is used to adhere the second backing to the primary backing The pre-coat adhesive layer and the second adhesive layer may be made of different types of latex. For example, different amount of calcium carbonate particles may be added.

The invention also provides a method of manufacturing a second backing layer of a carpet, comprising the steps of:

providing a first electrically isolating layer substantially consisting of translucent rubber;

applying a first layer of uncured translucent electrically conductive rubber on top of the first layer of electrically isolating translucent rubber;

immersing a light source into the first layer of uncured translucent electrically conductive rubber;

curing the first layer of uncured translucent electrically conductive rubber to form a first electrically conductive layer;

providing a second electrically isolating translucent layer on top of the first electrically conductive layer;

applying a second layer of uncured translucent electrically conductive rubber on top of the electrically isolating translucent layer;

curing the second layer of uncured translucent electrically conductive rubber to form a second electrically conductive layer; and providing a third electrically isolating translucent layer on top of the second electrically conductive layer.

According to a preferred embodiment, the light source is a plurality of LEDs. In this embodiment, the step of immersing the light source should be a step of immersing LEDs each having a first electrode and a second electrode into the first layer of uncured translucent electrically conductive rubber such that the first electrode is at least partially immersed in the rubber.

According to an embodiment the textile is used as automotive textile, covering parts of the interior of an automotive vehicle (for example floor, roof, sidelines). Automotive vehicles have the advantage that it is easy to supply the light source with power, and that the surface is often metallic, which allows effective cooling of the light source(s).

It is noted that the invention relates to all possible combinations of features recited in the claims.

BRIEF DESCRIPTION OF THE DRAWINGS

These and other aspects of the invention will be apparent from and elucidated with reference to the drawings in which.

DETAILED DESCRIPTION OF EMBODIMENTS

It is noted that the same reference numbers have been used for corresponding elements in the embodiments whenever possible.

A carpet is taken as an example of the tufted textile according to the present invention to describe the present invention. It should be noted that the description is also applicable to other types of tufted textiles.

Figure 1:
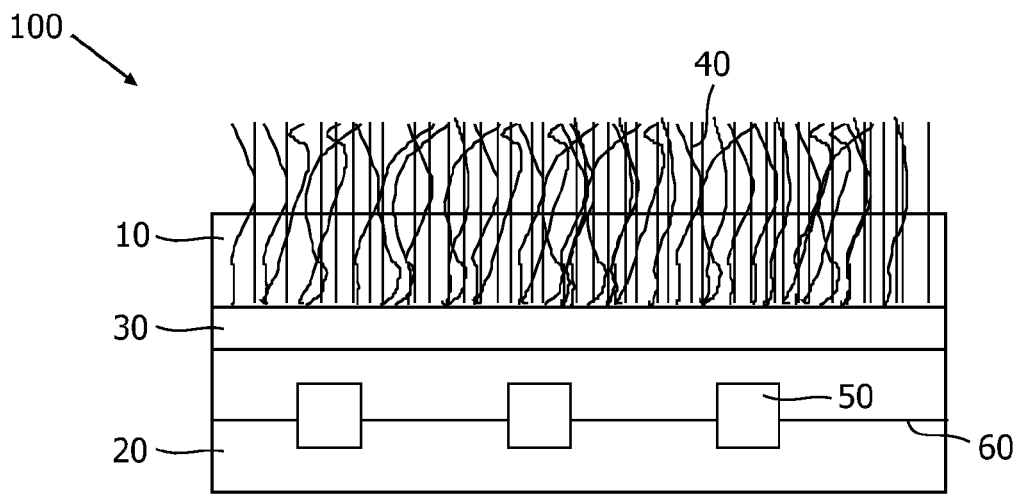
FIG. 1 schematically illustrates a cross sectional view of an embodiment of the carpet according to the invention.

Referring to FIG. 1, the cross section of an embodiment of a carpet 100 according to the present invention is shown. The carpet 100 comprises a primary backing layer 10, a second backing layer 20 and an adhesive layer 30 between the primary backing layer 10 and the second backing layer 20. Tufts 40 formed by yarns are provided on and held in place by the primary backing layer 10. LEDs 50 and a conductor arrangement 60 are integrated in the second backing layer 20. It is noted that the LEDs 50 and the conductor arrangement 60 may also be provided on top of the second backing layer 20, as described referring to FIG. 4.

The LEDs 50 are distributed over substantially the whole area of the second backing layer 20. Preferably, the distance between the LEDs 50 is 1-20 cm, more preferably 5-15 cm. The primary backing layer 10, the second backing layer 20 and the adhesive layer 30 have substantially the same surface area. The primary backing layer 10 and the adhesive layer 30 are substantially permeable to light. In this embodiment wherein the LEDs 50 and the conductor arrangement 60 are integrated in the second backing layer 20, the second backing layer 20 is at least partially permeable to light for allowing transmission of the light from the LEDs 50 to the adhesive layer 30. The light permeability of the layers 10, 20, 30 may be realized by the layers 10, 20, 30 being substantially translucent or the layers 10, 20, having apertures for the transmission of the light. In case the apertures are present in the primary backing layer 10, they are covered by the tufts 40 so that they will not be visible to human eyes. The primary backing layer 10 and the second backing layer 20 may substantially consist of e.g. polypropylene, nylon or jute. The adhesive layer 30 may substantially consist of e.g. latex.

When the LEDs 50 are turned on, the light from the LEDs 50 goes through the second backing layer 20, the adhesive layer 30 and the primary layer 10 because of their light permeable properties. The light will then pass through the gaps between the tufts 40, and will be emitted to the outside of the carpet. The density and the type of the tufts 40 used can control the amount and/or distribution of light emitted from the carpet 100. When the LEDs 50 are turned off, only the tufts 40 will be visible, and the carpet 100 will not look different from a regular carpet.

The second backing layer 20 may be based upon an existing product for the secondary backing layer, such as the one known under the name ActionBac (R). This is a backing made of a leno weave of slit film and spun olefin yarns. It has a 2.1 ounce per square yard (0.71 gram per square meter) fabric with polypropylene warp tapes and polypropylene multifilament picks in a leno wave with averages of 16 warps per inch (per 2.54 cm) and 5 picks per inch (per 2.54 cm). Such a backing layer imparts dimensional stability with good delamination strength in carpets. This backing layer also has openness well suited for robust curing rates during manufacture. The air permeability of this backing, determined according to ASTM D-737 with a pressure differential equal to 0.5 inch water, exceeds about 750 ft$^3$/min/ft$^2$ (229 m$^3$/min/m$^2$), which is ample for robust binder cure rates. Another such product with a higher count, 18×13, leno wave construction, has average air permeability above about 720 ft$^3$/min/ft$^2$ (219 m$^3$/min/m$^2$). This is also well suited for efficient cure rates. Preferably, the second backing layer 20 has a high adhesive compatibility with the material used for the adhesive layer 30, so that the carpet 100 will pass delamination test such as the test described in ASTM D-3936. The delamination resistance-imparting properties should preferably be such that the backing when laminated in the reference carpets described has a delamination strength of at least 2.5 pounds/in (44.6 kg/m). However, preferred values are greater than 3-4 pounds/in (53.6-71.4 kg/m), more preferably at least 5.5 pounds/in (98.2 kg/m) and even more preferably at least 6 pounds/in (107.1 kg/m).

It should be noted that any other existing second backing material may be used as basis for the second backing used in this invention. Other examples are needlefelt backings, rubber backings, PVC backings, polyurethane backings, vinyl backings, cushion backings, nylon backings. The fibers in the needlefelt backings are needled for bonding. It is also noted that a cushion or padding may be integrated in the second backing. Another example of a second backing material is bitumen. This material is used when extra sturdy carpet is required, such as for example in carpet tiles, or in car mats. In some embodiments (for example as in FIG. 2a), bitumen may also be used as adhesive.

Figure 2A:
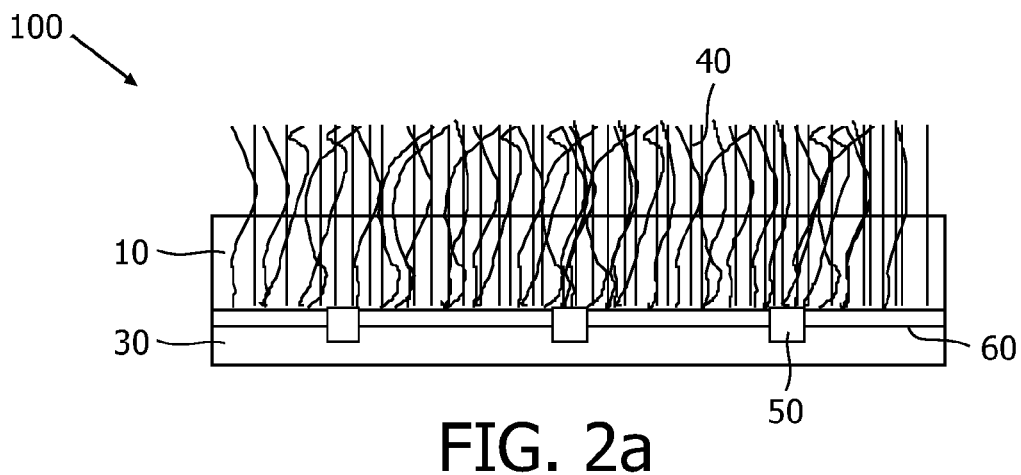
FIGS. 2a and 2b schematically illustrate a cross sectional view of further two embodiments of the carpet according to the invention.
Figure 2B:
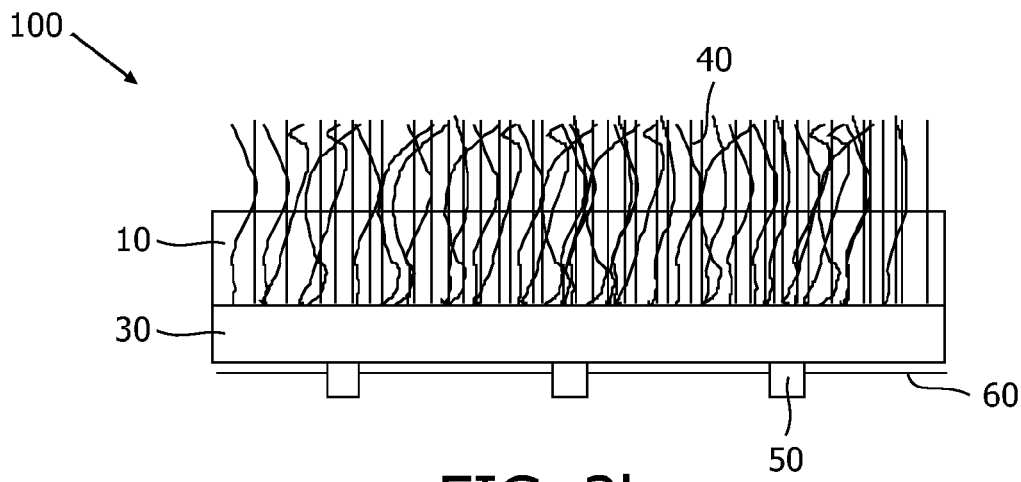

Referring to FIGS. 2a and 2b, the cross section of two further embodiments of a carpet 100 according to the present invention is shown. This embodiment is similar to the embodiment shown in FIG. 1 except for the lack of the second backing layer 30 which is present in the embodiment of FIG. 1. In FIG. 2a, the LEDs 50 are provided directly on the primary backing layer 10. The LEDs 50 and the conductor arrangement 60 are embedded in the adhesive layer 30. In FIG. 2b, the LEDs 50 and the conductor arrangement 60 are provided on the surface of the adhesive layer 30.

Figure 3:
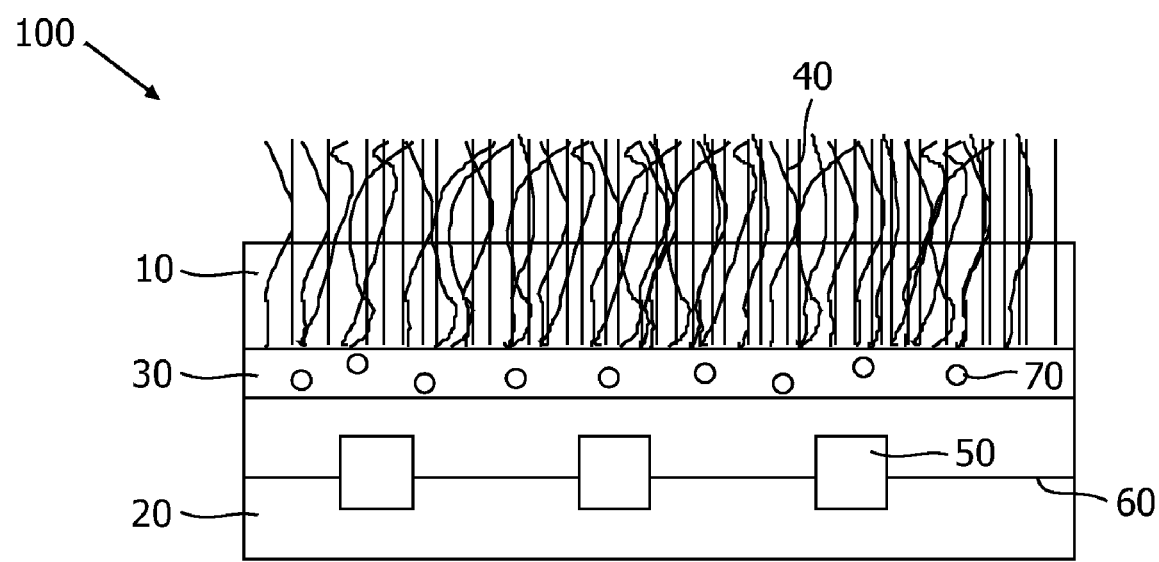
FIG. 3 schematically illustrates a cross sectional view of a further embodiment of the carpet according to the invention.

Referring to FIG. 3, the cross section of a further embodiment of a carpet 100 according to the present invention is shown. This embodiment is similar to the embodiment shown in FIG. 1 except for the light scattering particles 70 embedded in the adhesive layer 30. The light scattering particles 70 may be e.g. calcium carbonate. The use of calcium carbonate has an advantage that it is relatively inexpensive. The adhesive layer 30 may comprise, in addition or alternatively to the light scattering particles 70, electrically conductive particles. The electrically conductive particles improve the anti-static properties of the carpet. The electrically conductive particles may be e.g. carbon black, potassium formate (HCOOK), tin-oxide, indium-tin-oxide or silver. It is to be noted that the size of the electrically conductive particles may be chosen to have light scattering properties. Furthermore, in addition or alternatively to the above-mentioned particles, the adhesive layer may comprises anti-oxidants. The anti-oxidants make the adhesive layer more resistant to heat.

It is to be noted that the primary backing layer 10 and the second backing layer 20 may also comprise light scattering particles 70.

Figure 4:
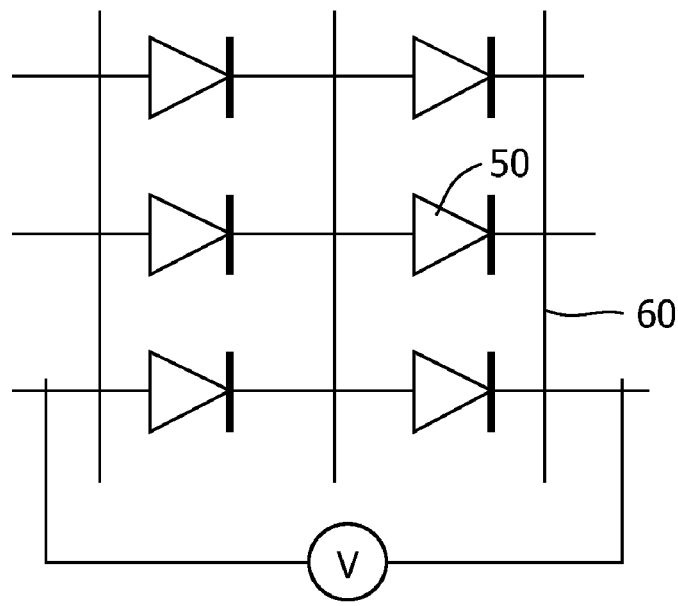
FIG. 4 schematically illustrates an electric scheme of the LEDs and the conductor arrangement for the second backing layer according to the invention.

FIG. 4 schematically illustrates an electric scheme of the LEDs and the conductor arrangement for the second backing layer 20 according to the invention.

In this embodiment, the LEDs 50 are connected to form a circuit comprising sets of LEDs 50 connected in series wherein the sets are connected in parallel. The advantage of this embodiment is that the construction is simple and easy to manufacture. The conductor arrangement 60 may be pre-manufactured on a sheet of for example plastic, after which it is embedded in the second backing layer material.

Figure 5:
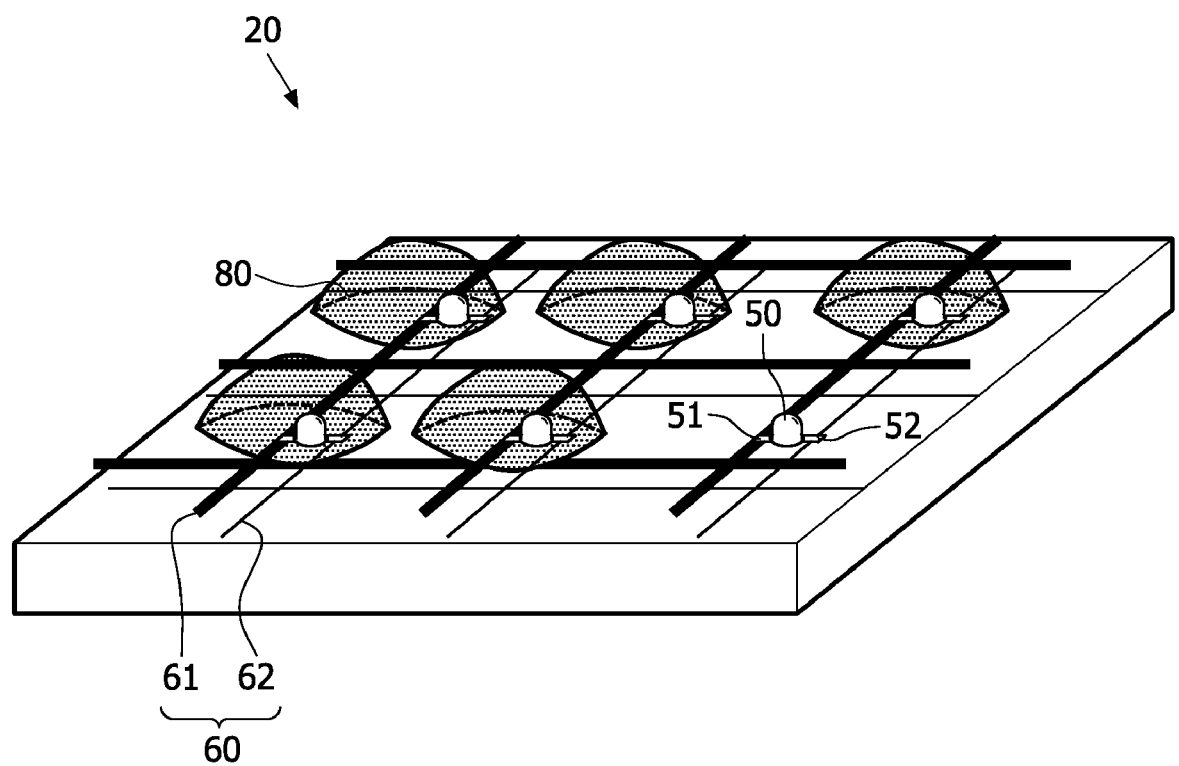
FIG. 5 schematically illustrates a perspective view of an embodiment of the second backing layer according to the invention.

FIG. 5 schematically illustrates the perspective view of an embodiment of the second backing layer 20 according to the invention.

In this embodiment, the LEDs 50 and the conductor arrangement 60 are provided on top of the second backing layer 20. The second backing layer 20 may also have recesses on its surface, into which the LEDs 50 are mounted. The conductor arrangement 60 comprises two grids of conductive wires 61, 62 which are electrically isolated from each other. When the carpet 100 is cut in the portions between the LEDs 50, the LEDs 50 are still connected to the power source, resulting in that the LEDs 50 are still able to be turned on and off. This substantially reduces the limitation in the size or shape the carpet 100 is cut.

In this embodiment, a protective cover 80 is disposed over each of the LEDs 50. The protective covers 80 may substantially consist of a silicone rubber. One of the LEDs 50 is shown without the protective cover. The second backing layer 20 may have apertures for air passage. Vaporized binders used for the adhesive layer 30 pass through the apertures during curing of the carpet 100. This ensures that the air permeability of the second backing layer 20 is sufficiently high. These apertures allow more freedom in the choice of materials for the second backing layer 20 in that the second backing layer 20 with low air permeability may be used.

It is to be noted that the conductor arrangement 60 may be made with more than two grids. For example, when four grids are used, it is possible to control the color of RGB LEDs.

Figure 6:
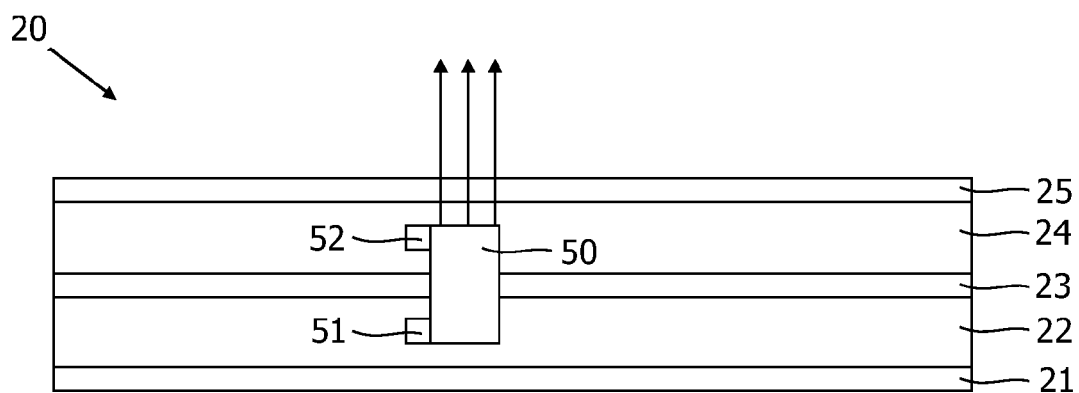
FIG. 6 schematically illustrates a cross sectional view of a further embodiment of the second backing layer according to the invention.

FIG. 6 schematically illustrates the cross section of a further embodiment of the second backing layer 20 according to the invention. For the carpet 100 to emit light from its pile surface, the LED 50 used herein may be a side emitting LED, or a normal LED with adapted electrode connectors.

In this embodiment, the second backing layer 20 comprises, successively from the side facing away from the adhesive layer, a first electrically insulating layer 21, a first electrically conductive layer 22, a second electrically insulating layer 23, a second electrically conductive layer 24 and a third electrically insulating layer 25. The LED 50 is embedded in the second backing layer 20. Each of the LEDs 50 has a first and a second connector 51 and 52 respectively connected to the first and the second electrically conductive layers 22 and 24. A single power supply is required to connect all LEDs 50. An installer can cut this carpet in any size and the LED system will still operate in the same way. This multilayer construction also has an advantage that the LEDs are protected well against damage and water.

In this embodiment, the layers 21-25 may be translucent. The electrically insulating layers 21, 23, 25 may be made of a translucent rubber. The electrically conductive layers 22, 24 may be a translucent rubber comprising electrically conductive particles.

Figure 7:
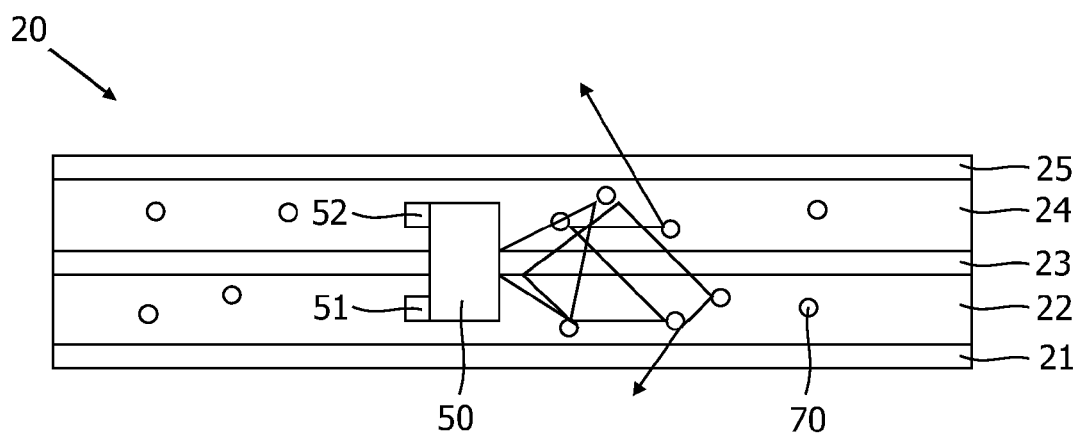
FIG. 7 schematically illustrates a cross sectional view of a further embodiment of the second backing layer according to the invention and FIG. 8 schematically illustrates a cross sectional view of an embodiment of the carpet according to the invention.

FIG. 7 schematically illustrates the cross section of a further embodiment of the second backing layer 20 according to the invention. In this embodiment, light from the LED 50 is emitted in horizontal direction, which is perpendicular to the preferred light output direction. For emitting the light in the direction of the pile surface of the carpet, light scattering particles 70 are embedded in the conductive layers 22 and 24. The light scattering particles 70 scatter the light from the LED 50 and the light is emitted outside of the second backing layer. It is to be noted that the electrically conductive particles imparting the conductivity to the electrically conductive layers 22 and 24 may be used for light scattering purpose. In other words, the size of the electrically conductive particles may be adapted to also serve as the light scattering particles 70. A reflecting layer may be provided under the layer 21 for redirecting light in the direction of the side facing the adhesion layer 30.

Figure 8:
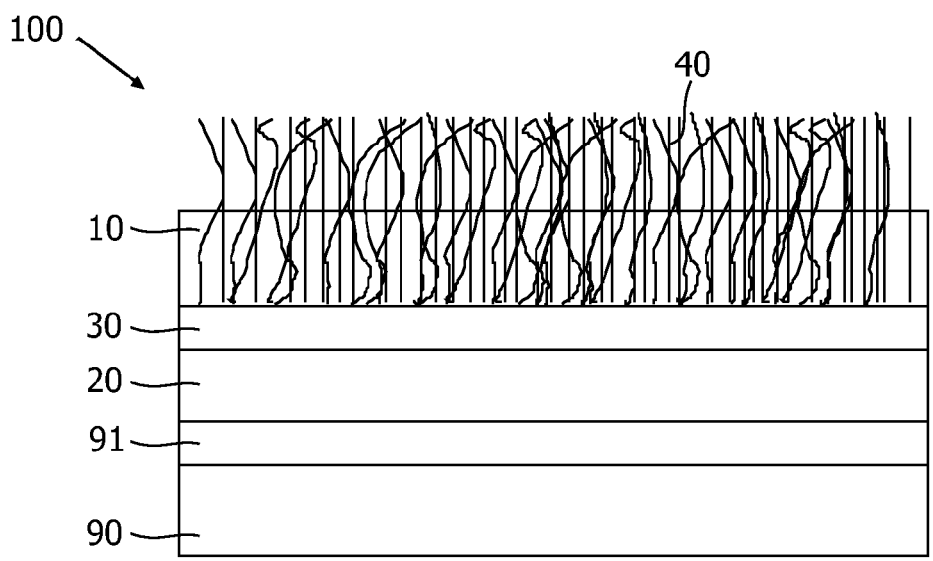

FIG. 8 schematically illustrates the cross section of an embodiment of a carpet 100 according to the present invention. This embodiment is similar to the embodiment shown in FIG. 1 except for the light source being a light emitting sheet 90 instead of individual LEDs. The light emitting sheet may be e.g. an electroluminescent panel, a LED panel comprising a plurality of LEDs or an OLED panel. The LED panel may be a string of LEDs mounted on a flexible PCB, on which electronics are arranged that allow the LED panel to be cut at a desired length. The conductive arrangement 60 is not shown for clarity's sake.

This light emitting panel 90 is adhered on a side of the second backing layer 20 facing away from the adhesive layer by a second adhesive layer 91. The second backing layer 20 and the second adhesive layer 91 may be at least partially permeable to light for allowing transmission of the light from the light emitting panel 90 to the adhesive layer 30 between the primary backing layer 10 and the second backing layer 20. This may be achieved by the use of a second backing layer 20 and a second adhesive layer 91 which are at least partly translucent. Such a second backing layer 20 may be obtained by providing the second backing layer 20 with apertures large enough to transmit light but small enough to maintain its surface substantially the same as the primary backing layer 10 and the adhesive layer 30. The second adhesive layer 81 may be made at least partly translucent in a similar manner as the adhesive layer 30 between the primary backing layer 10 and the second backing layer 20. Translucent latex, without light scattering particles such as calcium carbonate, may be used for this purpose. The carpet 100 may further comprise a reflecting layer (not illustrated) positioned to a side of the light emitting panel 90 facing away from the second backing layer 20.

FIGS. 9a-d schematically illustrate an exemplary method of manufacturing the second backing according to the invention using translucent rubber.

Figure 9A:
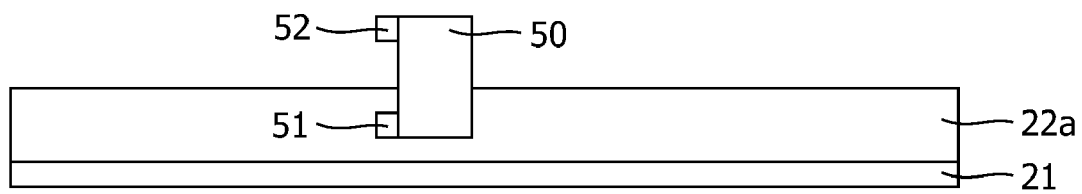
FIGS. 9a-d schematically illustrate an exemplary method of manufacturing the second backing according to the invention using translucent rubber and FIGS. 10a and 10b show experimental results of the optical properties of a conventional carpet and the carpet according to the present invention.

As illustrated in FIG. 9a, first, a layer 22a of uncured translucent electrically conductive rubber is applied on top of a layer 21 of cured electrically isolating translucent rubber. While the layer 22a applied on top of the layer 21 is in a liquid form, a LED 50 is immersed into the rubber. The immersion is done in such a way that the electrode 51 of the LED 50 is at least partly immersed in the rubber. Subsequently the rubber layer 22a is cured to form the translucent electrically conductive layer 22, for example with vulcanization, or any other suitable means for curing the rubber.

Figure 9B:
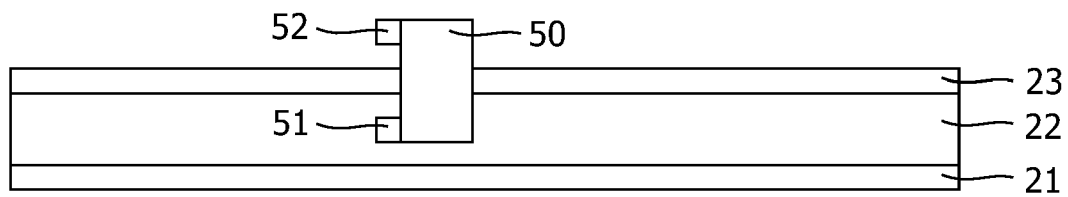

After the electrically conductive layer 22 is formed, a layer of electrically isolating translucent rubber 23 is applied on top of the layer 22, as illustrated in FIG. 9b. The thickness of this layer 23 is such that the electrode 51 is now fully immersed, and that the electrode 52 is at least partially uncovered. The layer 23 may be applied in liquid form after which it is cured, but it is also possible to use a pre-shaped sheet, which is glued to layer the layer 22.

Figure 9C:
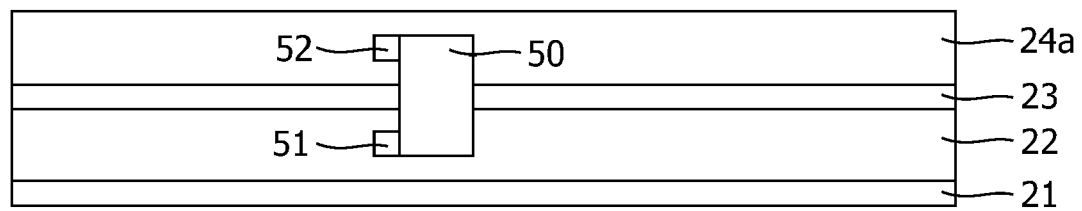

Subsequently, another layer 24a of uncured translucent electrically conductive rubber is applied onto the electrically isolating layer 23, as illustrated in FIG. 9c. Subsequently the rubber is cured to form the electrically conductive layer 24. The amount of the uncured rubber is chosen such that at least part of the electrode 52 is immersed in the electrically conductive layer 24 formed by the curing of the rubber.

Figure 9D:
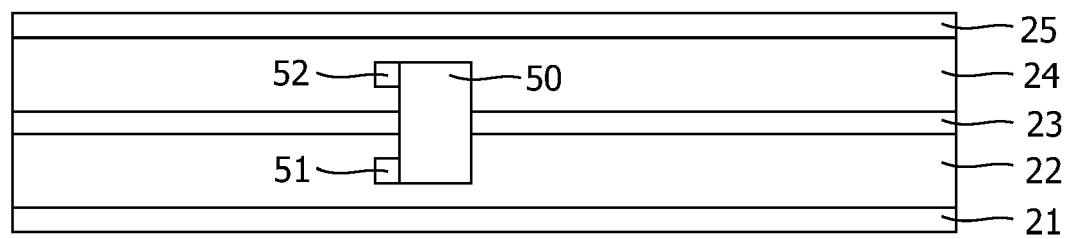

Then, as illustrated in FIG. 9d, another layer of electrically isolating translucent rubber 25 is applied in order to seal off the device such that no electrical voltage is on the outside and the device may be handled safely.

In the above manufacturing example uncured rubber is used. However, it should be noted that also pre-shaped cured sheets may be used.

An advantage of this method is that the manufacturability is improved because the LEDs do not have to be connected by wires.

Figure 10A:
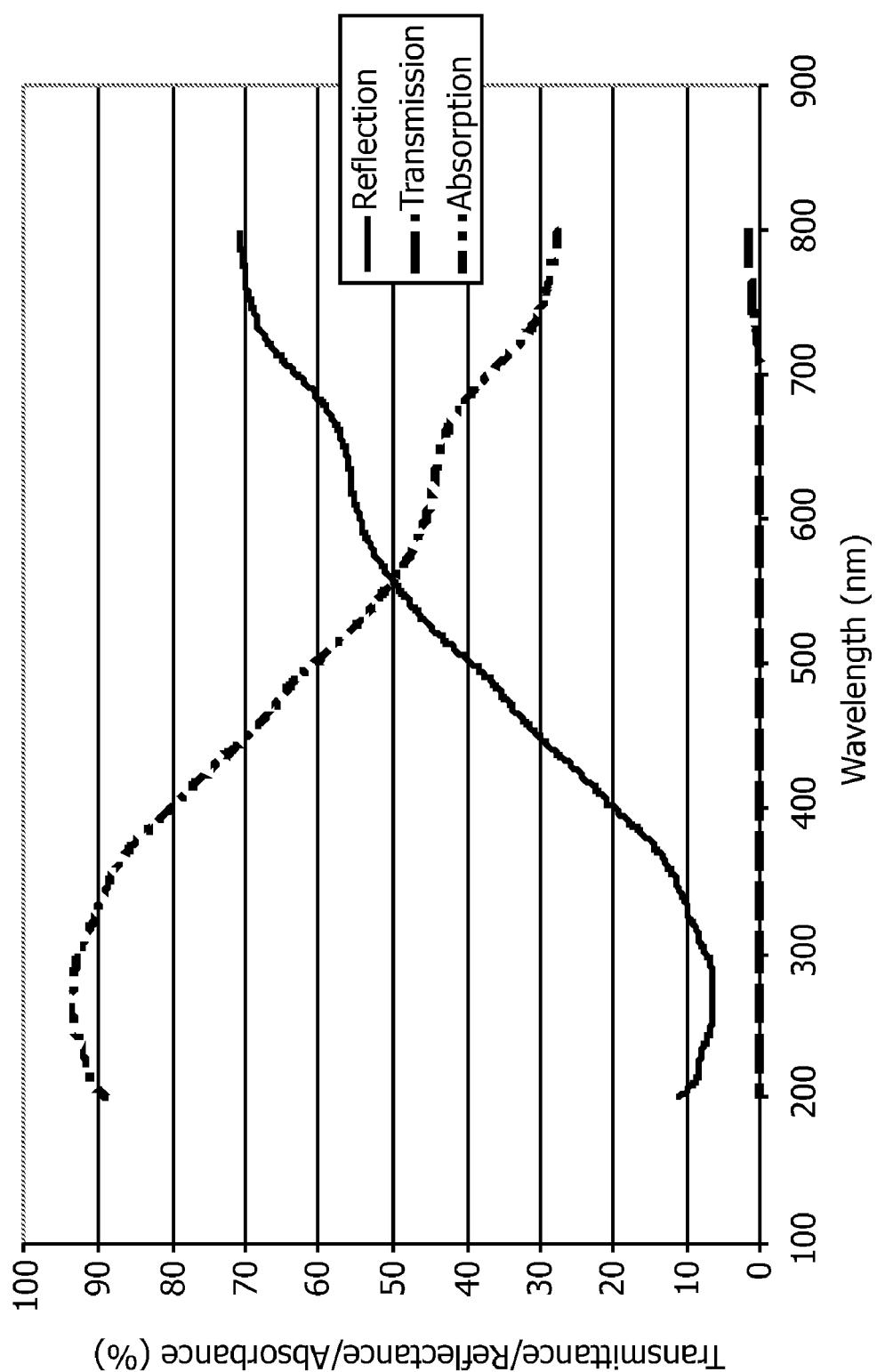

FIGS. 10a and b show experimental results of the optical properties of the conventional carpet and the carpet according to the present invention. FIG. 10a shows the reflection, transmission and absorption of a conventional carpet consisting of a primary backing layer, a second backing layer (sold under the name of Action Bak®) and an adhesive layer. The measurement shows that the optical transmission is below 1% over the wavelength range of 200 nm to 800 nm and the absorption is so high that even with back-reflector less than 1% of light will be transmitted. This results from the fact that the conventional adhesive layer comprises a too high amount of calcium-carbonate particles which makes the adhesive layer opaque.

Figure 10B:
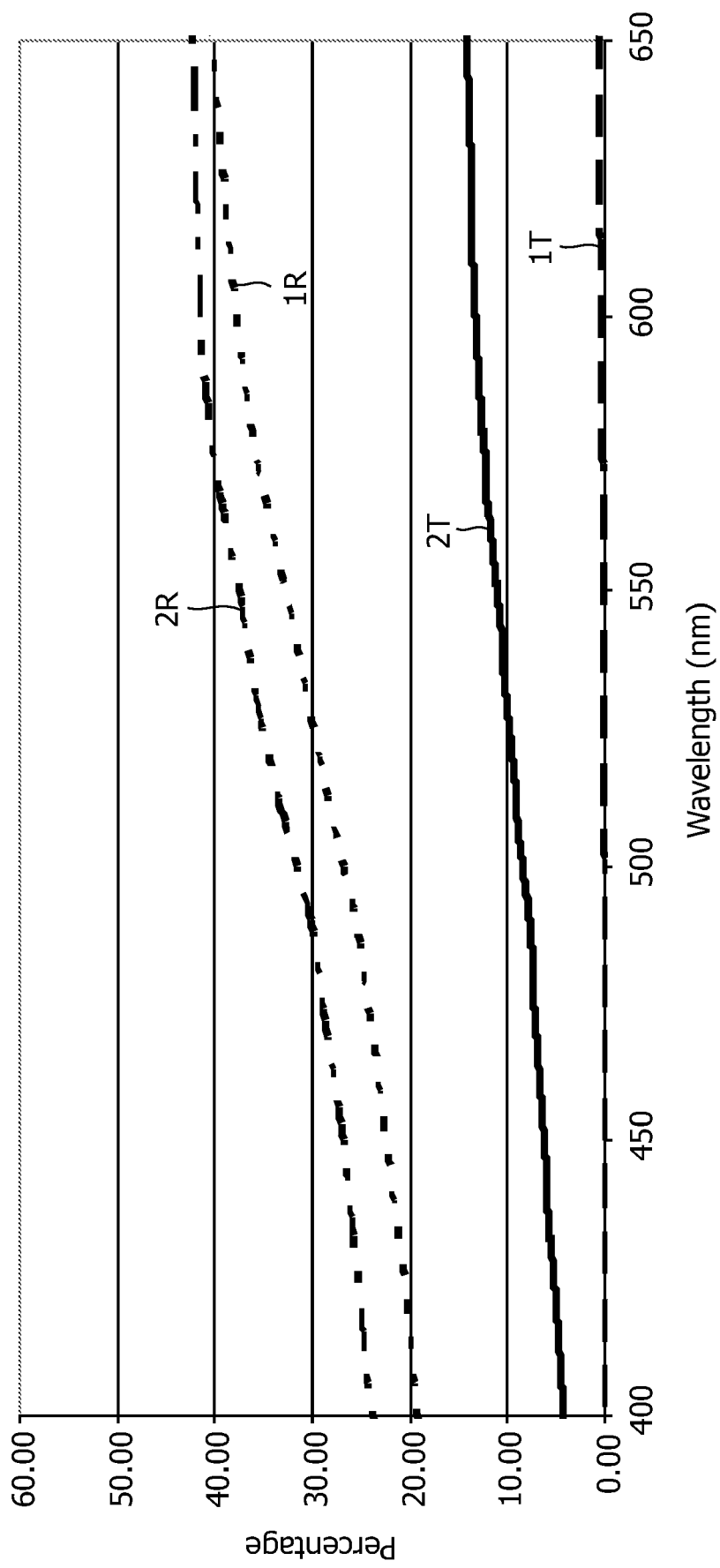

According to the tufted textile according to the present invention, the materials for the adhesive layer and the second backing layer are chosen so that these layers will transmit light. An experimental result of the transmission and the reflection of the carpet according to the present invention is shown in FIG. 10b in comparison with a conventional carpet. In the figure, 1R, 2R, 1T and 2T refer to reflection of the conventional carpet, reflection of the carpet according to the present invention, transmission of the conventional carpet and transmission of the carpet according to the present invention, respectively. The carpet according to the present invention comprises an adhesive layer made of a transparent latex that does not comprise calcium carbonate particles and a second backing layer having apertures (e.g. Action Bak®). At 550 nm, the transmission increased to 11% in the carpet according to the present invention compared to below 0.2% in the conventional carpet. The reflectivity increased from 32% to 37% at 550 nm. It should be noted that with back-reflector the total light transmittance can be increased further. Also, by integrating the light source in the carpet structure (see for example FIG. 2A) the optical transmittance may be increased further.

Various modifications of the exemplary embodiments described above will be apparent to those skilled in the art. For example, the number of the backing layer is not limited to two or three.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. A tufted textile comprising:
   a primary backing layer which is substantially permeable to light,
   yarns forming tufts on a first side of the primary backing layer,
   an adhesive layer provided on a second side of the primary backing layer opposite from the first side, and
   a light source and a conductor arrangement for the light source arranged in a position facing the second side of the primary backing layer,
   wherein the adhesive layer, the light source and the conductor arrangement, are arranged so as to allow light from the light source to reach the primary backing layer, and wherein the light source is covered by the yarns forming tufts on the first side of the primary backing layer.

2. The tufted textile as claimed in claim 1, wherein the adhesive layer is at least partially permeable to light for allowing transmission of the light from the light source to the primary backing layer.

3. The tufted textile as claimed in claim 1, wherein the adhesive layer comprises at least one of latex and acrylics.

4. The tufted textile as claimed in claim 1, wherein the adhesive layer is translucent.

5. The tufted textile as claimed in claim 1, further comprising a second backing layer provided on a side of the adhesive layer facing away from the primary backing layer, wherein
   the primary layer, the adhesive layer and the second layer have substantially the same surface area,
   the adhesive layer and the primary backing layer are substantially permeable to light and
   the light source, the conductor arrangement and the second backing layer are arranged so as to allow light from the light source to reach the adhesive layer.

6. The tufted textile as claimed in claim 5, wherein the light source and the conductor arrangement are integrated in the second backing layer, wherein the second backing layer is at least partially permeable to light for allowing transmission of the light from the light source to the adhesive layer, or the light source and the conductor arrangement are provided on the surface of the second backing layer facing the adhesive layer.

7. The tufted textile as claimed in claim 1, wherein the light source is one or more LEDs.

8. The tufted textile as claimed in claim 6, wherein the LEDs and the circuit arrangement are arranged so that at least a substantial part of the LEDs is operable when the tufted textile is reduced in size.

9. The tufted textile as claimed in claim 6, wherein the LEDs are Red-Green-Blue LEDs.

10. The tufted textile as claimed in claim 1, wherein the light source comprises a light emitting sheet arranged on a side of the second backing layer facing away from the adhesive layer.

11. The tufted textile as claimed in claim 10, wherein the light emitting sheet comprises an electroluminescent panel, an LED panel or an OLED panel.

12. The tufted textile as claimed in claim 10, further comprising a reflecting layer positioned to a side of the light emitting sheet facing away from the second backing layer.

13. The tufted textile as claimed in claim 1, wherein the tufted textile is a carpet.

14. A method of manufacturing a carpet comprising a light source and a conductor arrangement for the light source, comprising the step of:
    adhering a primary backing layer which is substantially permeable to light provided with yarns forming tufts and a second backing layer having substantially the same surface area as the primary layer with an adhesive layer which is substantially permeable to light and having substantially the same surface area as the primary backing layer and the second backing layer,
    wherein the light source, the conductor arrangement and the second backing layer are arranged so as to allow light from the light source to reach the adhesive layer, and wherein the light source is covered by the yarns forming tufts on the first side of the primary backing layer.

* * * * *